(12) United States Patent
Ninaber et al.

(10) Patent No.: US 10,788,067 B2
(45) Date of Patent: Sep. 29, 2020

(54) COUPLING ASSEMBLY FOR COUPLING FLAT PANELS

(71) Applicants: Paulus Johannes Ninaber, Enkhuizen (NL); Johannes Hendrikus Ninaber, Enkhuizen (NL); Maria Gerberdina Cornelia Kuypers, Enkhuizen (NL)

(72) Inventors: Paulus Johannes Ninaber, Enkhuizen (NL); Johannes Hendrikus Ninaber, Enkhuizen (NL); Maria Gerberdina Cornelia Kuypers, Enkhuizen (NL)

(73) Assignee: Bicsy International BV, Den Bosch (NL)

( * ) Notice: Subject to any disclaimer, the term of this patent is extended or adjusted under 35 U.S.C. 154(b) by 326 days.

(21) Appl. No.: 14/930,036

(22) Filed: Nov. 2, 2015

(65) Prior Publication Data

US 2016/0169257 A1 Jun. 16, 2016

(30) Foreign Application Priority Data

Nov. 3, 2014 (NL) ...................................... 1041030

(51) Int. Cl.
*B44C 1/28* (2006.01)
*F16B 5/06* (2006.01)
(Continued)

(52) U.S. Cl.
CPC .............. *F16B 5/0635* (2013.01); *B44C 1/28* (2013.01); *B44C 5/0461* (2013.01);
(Continued)

(58) Field of Classification Search
CPC ............ F16B 2005/0678; F16B 5/0056; F16B 5/0084; F16B 5/0088; F16B 5/06; F16B 5/0607; F16B 5/0635; F16B 5/0614; F16B 5/008; B44C 1/28; B44C 5/02; B44C 5/0461; A47G 1/16; A47G 1/1606; A47G 1/1686; Y10T 403/349
See application file for complete search history.

(56) References Cited

U.S. PATENT DOCUMENTS 3,224,062 A * 12/1965 Polonsky ................ F16B 5/065
24/458
3,854,259 A 12/1974 Lechene
(Continued)

FOREIGN PATENT DOCUMENTS

DE 20106153 11/2001
DE 102 04 154 * 8/2003 .............. E04F 13/08
(Continued)

OTHER PUBLICATIONS

International Search Report NL1041030 dated Aug. 10, 2015.

*Primary Examiner* — Michael P Ferguson
(74) *Attorney, Agent, or Firm* — Robert M. McDermott

(57) ABSTRACT

An assembly for, for example, a photo collage featuring first (1) and second elements (3), with the first elements (1) containing a flat panel and the second elements forming coupling members (3) to interconnect the first elements. The first elements (1) feature as openings (2) near a corner of the flat panel at least two notches (9) in the edges and the coupling member features at least two complementary protrusions (5) that work together with the notches (9).

20 Claims, 20 Drawing Sheets

(51) Int. Cl.
    *B44C 5/04* (2006.01)
    *F16B 5/00* (2006.01)
    *F16B 2/22* (2006.01)
(52) U.S. Cl.
    CPC .............. *F16B 5/0084* (2013.01); *F16B 2/22* (2013.01); *F16B 5/002* (2013.01)

(56) References Cited

U.S. PATENT DOCUMENTS

| | | | |
|---|---|---|---|
| 4,497,125 A | 2/1985 | Hutchinson | |
| 4,650,261 A * | 3/1987 | Winter | A47B 57/48 |
| | | | 108/180 |
| 4,793,725 A | 12/1988 | Cheng | |
| 5,482,491 A * | 1/1996 | Kichijyo | A63H 33/08 |
| | | | 446/112 |
| 5,517,731 A | 5/1996 | Spykerman | |
| 6,054,968 A | 4/2000 | DeMatteo | |
| 6,467,307 B1 * | 10/2002 | Watson | A44C 13/00 |
| | | | 446/120 |
| 7,389,618 B1 * | 6/2008 | Herkstroeter | E04B 1/34321 |
| | | | 52/285.3 |
| 7,784,232 B2 * | 8/2010 | Nygren | E04H 9/10 |
| | | | 24/457 |
| 7,914,228 B2 * | 3/2011 | Rapaz | E01C 5/005 |
| | | | 404/34 |
| 8,096,089 B2 | 1/2012 | Platt | |
| 2005/0257484 A1 * | 11/2005 | Aaron | F16B 5/0084 |
| | | | 52/712 |
| 2012/0324708 A1 | 12/2012 | Minin | |
| 2015/0003919 A1 * | 1/2015 | Imel | F16B 5/0088 |
| | | | 405/218 |
| 2016/0058213 A1 | 3/2016 | Vaessen et al. | |

FOREIGN PATENT DOCUMENTS

| | | |
|---|---|---|
| EP | 1400641 | 3/2004 |
| EP | 2 451 548 | 6/2010 |
| EP | 2784399 | 10/2014 |
| EP | 2 992787 | 3/2016 |

* cited by examiner

COUPLING ASSEMBLY FOR COUPLING FLAT PANELS

BACKGROUND AND SUMMARY OF THE INVENTION

The invention concerns an assembly featuring first and second elements, with the first elements containing a flat panel and the second elements constituting coupling members to interconnect the first elements, with the first elements featuring openings near a corner of the flat panel and the second elements featuring at least a base part with two or more protrusions that work together with the openings in the first elements and which protrusions feature a bulge at an end facing away from the base part.

An assembly for mounting panel materials together is known. An example of such an assembly contains panel-type elements, for example featuring one or several images. The corners of the panel-type elements feature holes through the panel material. Furthermore, the assembly also contains coupling members to interconnect the panel-type elements. The coupling members contain a base part of a cross-shaped, straight or triangular design, with protrusions on the ends of the base parts. An upright end of such a protrusion, i.e. facing away from the base part, features a bulge.

The panel-type elements are assembled into one integral whole by pressing the upright protrusions of the coupling members through the openings in the corners of the panel-type elements over the bulge of the protrusion of the coupling members, after which the panel-type elements are enclosed between the bulges of the protrusions and the base parts of the coupling members. The bulge of the upright protrusion can be overcome because the panel-type material can stretch around the hole to a certain extent, enabling the hole to be stretched.

This enables a number of panel-type elements to be interconnected and to make a collage of images for example. The collage can be expanded or changed.

A disadvantage of such a known design is that, when changing and/or suspending a collage it will be hard to prevent the collage from coming apart and complicated actions will be necessary. A major limitation is also that the panel material must not be too thick, since otherwise the hole in the panel material will not be able to stretch sufficiently to pass the bulge in the upright element and to be able to push the bulge through the hole. Another major disadvantage is that, when applying the holes while manufacturing the tile-shaped panel a large number of actions are required in order to clean these holes and free them from material without the excess material from the hole getting in between or onto the tile or getting in the way when printing an image, for example, and causing a failure; furthermore the hole diameter must be very accurate in order to enable the bulge to be pushed through without the connection becoming too loose too easily.

However, it is noted that assemblies based on other principles are known from some documents.

EP1400641 describes an assembly of parquet panels. These parquet panels are joined together. The parquet panels have recesses on their sides into which coupling members can be inserted in order to click the panels together.

EP2784399 describes an assembly for an underlayment. This assembly consists of tiles. The edges of the tiles feature recesses and coupling members to click the tiles together in order to form a flat underlayment.

EP2166662 describes an assembly for a modular ceiling. This assembly contains ceiling panels that feature coupling members on their rear. The coupling members are coupled to suspension elements mounted onto beams.

WO2011/110972 describes an assembly for a toy racing track. The racing track features track elements with recesses on both sides. The track elements are clicked together using coupling members that are slid into the recesses.

DE2016153 describes a method of making a photographic image on a large surface and then cutting out partial images from it.

U.S. Pat. No. 5,517,731, describes a clip to attach two parts of cars together.

An objective of the invention is to provide an assembly that is easier to change and to handle and can also be applied to thicker and more stable panel materials and to provide an easy manufacturing step that creates no or few small loose parts that can lead to undesired interruptions during further processing.

To achieve this, the assembly according to the invention is characterized in that the first elements feature at least two incisions in the edges as notches on both sides of a corner in the panel material, and the coupling member features at least two complementary protrusions that work together with the notches at the locations of the notches on both sides of a corner. The flat panel is flexible, and, when assembled, the base part and the bulges are located on both sides of the flat panel.

In the known design, the first element features a hole in the corner with a protrusion protruding through it. If a first element has been attached to a coupling member, it can move in different directions relative to the coupling member and the total assembly. It can both rotate around the protrusion and tilt or slide relative to the protrusion.

The elements may start to move if a first element is detached from a collage or if the collage is changed partially or completely, for example when changing the location of a number of elements in the collage when suspended from a wall. This makes it difficult to hold one or more elements or the rest of the collage and keep them in place. Parts of a collage move in directions that the user has not foreseen and cannot easily control. This necessitates the user using assistive devices such as tape, or first completely removing a collage of elements that needs to be changed from the wall and placing it on the floor to assemble it into a changed collage and then mounting the complete assembled collage onto a wall again, using assistive devices, and/or asking for a second person to help. Changing the assembly of a collage mounted on the wall has not been provided for and is therefore not easily possible or takes considerable effort.

In an embodiment according to the invention, a first element features at least two notches in the edges of the material, both on either side of a corner. A coupling member features at least two complementary protrusions that work together with each of the contiguous incisions in the edges of the material. The flexible panel can be slid between the base part and a bulge because the material can bend flexibly and, when bent, can be placed with the contiguous notches between the two contiguous protrusions. When returning to its flat, non-bent shape, the two contiguous notches of the flexible panel settle behind the bulges on the complementary protrusions on the coupling member. At least two connections are formed between a coupling member and a coupling member on both sides of a corner. This creates a stable assembly that cannot rotate. This limits a first element's freedom of movement relative to a coupling member. Rotating a first element around a protrusion is not possible and the ability of a first element tilting relative to a coupling member is reduced greatly. This enables a stable and rigid assembly of elements to be assembled and changes to a collage to be made more easily and it prevents the need for further assistive devices in order to mount the assembled collage in a straight and level position. "Notch" is taken to mean any notch or incision, or any otherwise removed or never formed part of the panel.

Preferably, the notches in the edges of an embodiment according to the invention are configured such that the notches extend to the diagonal of a corner.

Preferably, the notches in an embodiment according to the invention extend virtually transversally to an edge of a panel.

Here, the distance, perpendicular between two contiguous notches on the same corner in an embodiment according to the invention, when viewed from a corner, first decreases and then increases and then decreases again. This provides a good clamping action between the protrusions to enclose a first element.

Preferably, the coupling members in an embodiment according to the invention feature a slot that extends in a protrusion and through the bulge. This makes it easier to connect the elements and the coupling members together because, besides the fact that the panel material of the first elements can deform, the actual coupling member also allows for some movement, making it easier to bring the bulge past the notch in the panel material of the first elements.

These and further aspects of the invention are described below and illustrated by means of the drawing:

DETAILED DESCRIPTION OF THE INVENTION

Figure 1:
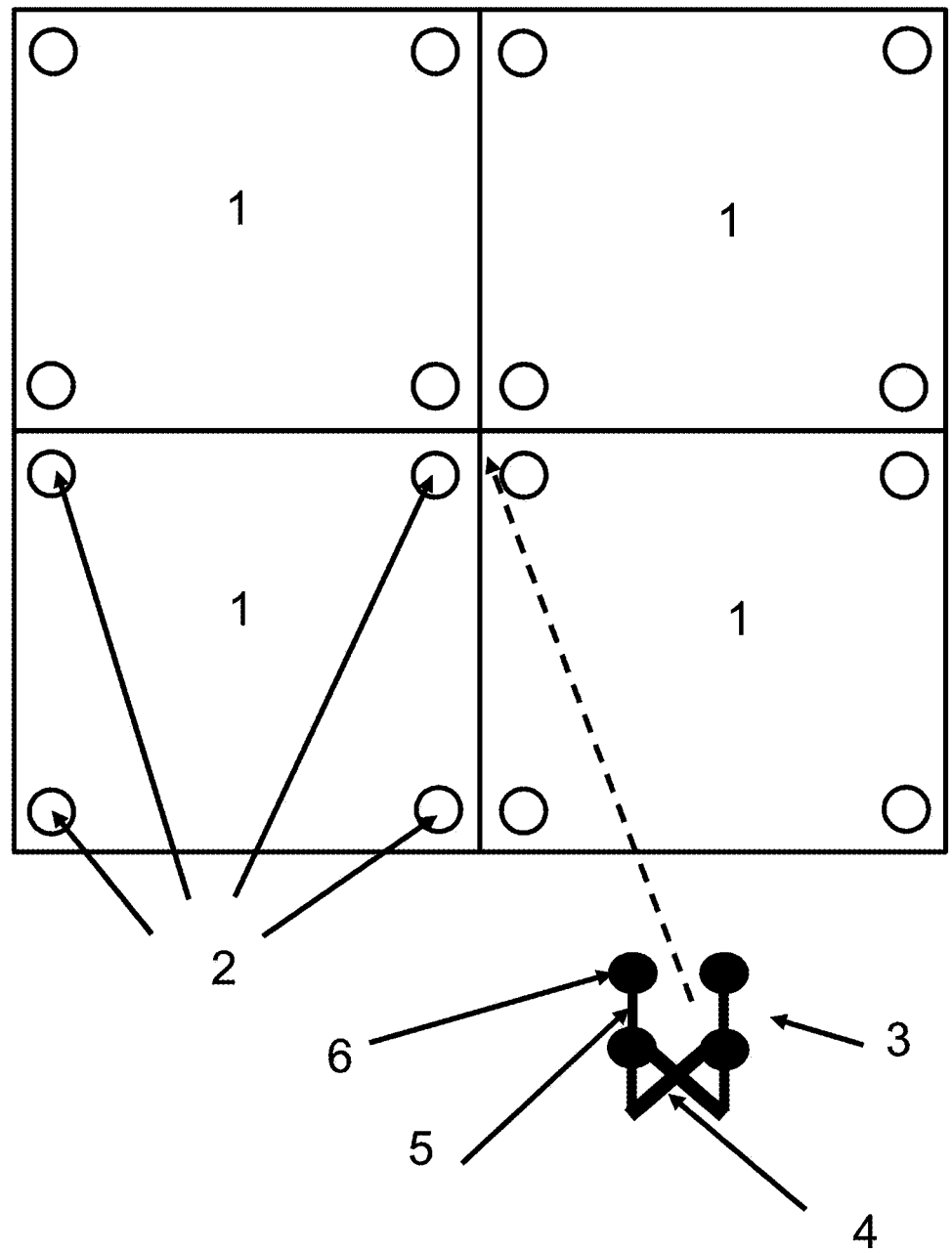
FIGS. 1 and 2 show a known assembly.

FIG. 1 shows a known assembly. The assembly features panel-type first elements 1. Their corners feature through-holes in the panel material 2. Furthermore, the assembly features second elements 3. These second elements 3 feature a base part 4 and an upright protrusion 5 that contains a bulge 6 at an end facing away from the protrusion 5. The bulges 6 are pushed through the openings 2 that attach the first elements 1 to the second elements 3. If a second element features four protrusions, four first elements can be connected together and the holes 2 are in the corners.

Figure 2:
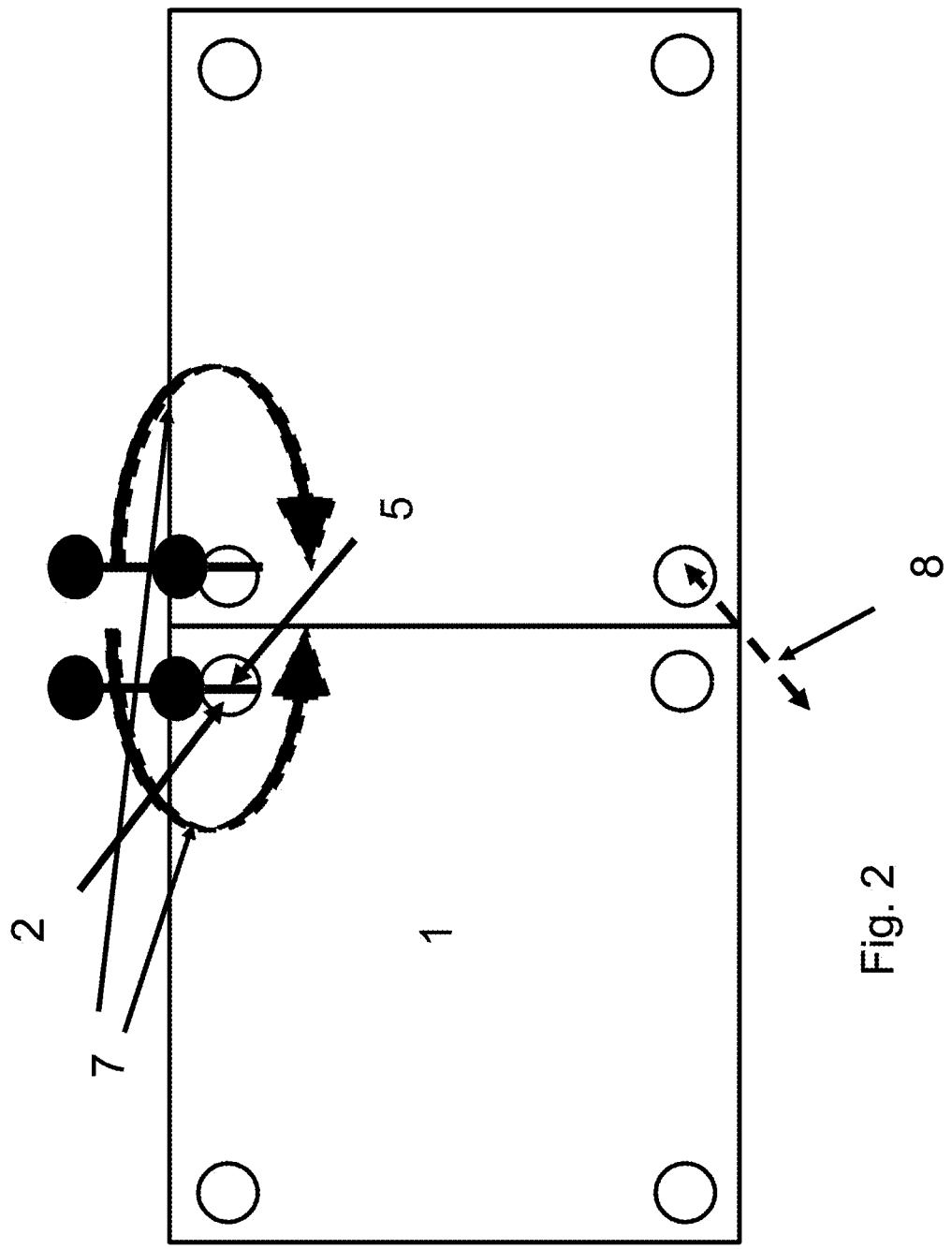

FIG. 2 shows a disadvantage of the known assembly. If two or more first elements 1 are connected to each other, they can move—after assembly—in directions that the user has not foreseen and cannot easily control, specifically while mounting the assembly to the wall. In this event, the movements have been illustrated by two arrows 8, the first elements 1 can each rotate freely around a protrusion in FIG. 2, indicated by arrow 7. A first element can also tilt relative to the second element. As a consequence, the user will have to use assistive devices such as adhesive tape or a mounting strip to keep the first mounted row of elements stable and prevent them rotating in respect of each other and will have to remove a collage of elements from the wall to change it and then place it on the floor to create a new assembly while again keeping the first mounted row of elements stable and preventing them from rotating in respect of each other and then mounting the integral new assembly to a wall and/or asking a second person to help. Changing the assembly of a collage mounted on the wall without affecting the stability of the entire assembly is not easily possible or takes considerable effort. FIG. 2 illustrates the problems for a first element and a second element, but the degree of freedom is also significant and handling the parts becomes difficult if two first elements are connected together.

Figure 3A:
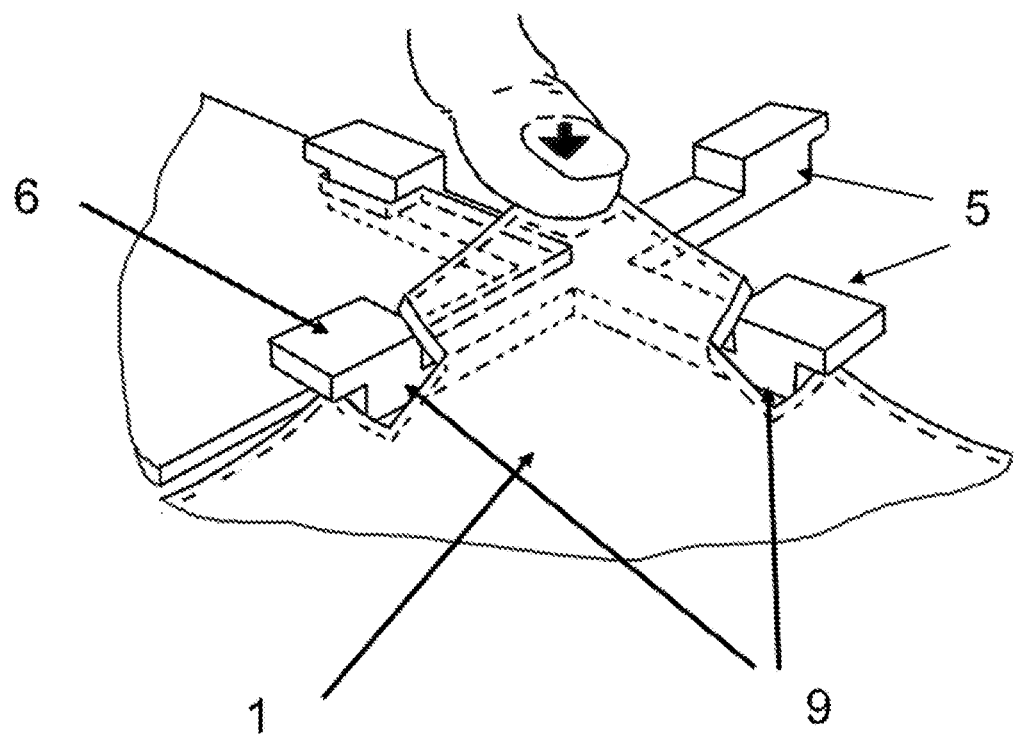
FIG. 3 shows an embodiment of the invention.
Figure 3B:
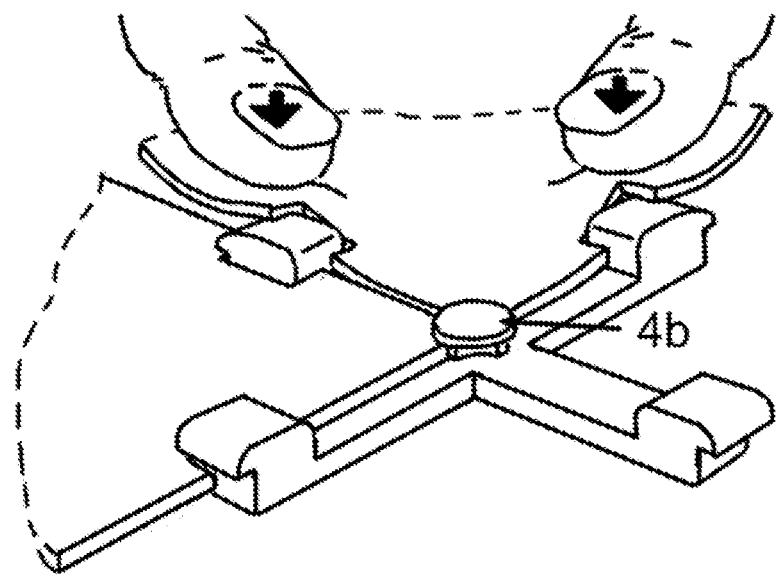

FIGS. 3A and 3B illustrate embodiments according to the invention.

The first elements 1 feature at least two incisions 9 in the edges of the panel material on both sides of a corner of this panel-type element, and the coupling member features at least two complementary protrusions of an even shape that work together with the incisions 9. The panel-type part of element 1 is pushed over the bulge 6 of the protrusions 5 of the coupling member 3. Two contiguous protrusions 5 on a coupling member 3 enclose a corner section of a panel-type part of the elements 1. The flexibility, i.e. elastic pliancy, in the corners of the elements 1 enables the corners of the elements 1 to be placed between the bulge 6 and the base part 4 of coupling members 3. The accurate and tension-free enclosure between base part 4 and the bulges 6 of the coupling member makes movements either along the directions in the flat plane of the assembly or tilting movements away from this flat plane virtually impossible and greatly reduces the degrees of freedom for movements of first elements 1 relative to a second coupling member 3 compared to the possible movement of existing assemblies such as shown in FIG. 2, for example. In this example of an embodiment according to the invention, the first elements are panel-type elements. That is a preferred embodiment. The center of the first element can feature parts that extend from the plane formed by the corners of the first element. Panel-type parts are featured in the corners of the first element, the shape of the first element between the corners can deviate from that of a panel, for example decorative shapes that slightly protrude from the plane for 3-dimensional or perforated forms of wall decoration. FIG. 3B differs from FIG. 3A in that it features a mushroom shaped protrusion 4b at the center of the cross-shaped base part 4. The tips of the elements 1 are formed such that they slide under the bulge of part 4b and are enclosed between base part 4 and the bulge of protrusion 4b. This secures the positions of the elements even better.

FIGS. 3A and 3B illustrate that the flat panel is flexible enabling it to be enclosed between the coupling members. The coupling members engage in incisions 9.

It should be noted here that the flat panels in the documents referred to above tend to be rigid and feature recesses on their sides for example. The coupling members in those examples of the prior art form spring elements that can be pushed into the recesses in order to interconnect the flat panels.

Figure 4:
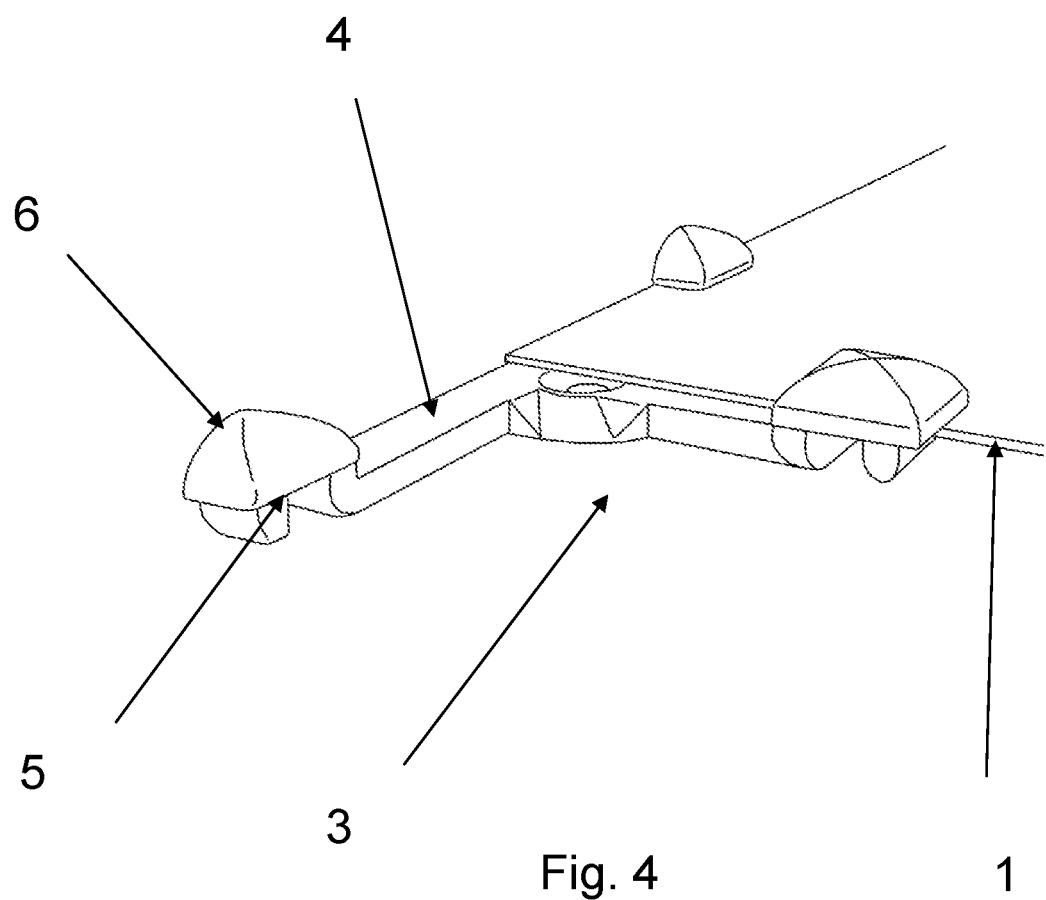
FIG. 4 illustrates the effect of the invention.

FIG. 4 illustrates the effect of the invention. The second element 3 in this example has the form of a tripod. Such elements are used on the edge of a collage. The panel-type part of the first element is clamped between two protrusions 5 of the same second element 3 due to incisions in the panel-type part working together with the bulges 6 at the end of the protrusions. The mutual positions of elements 1 and 3 are more or less fixed. This makes an assembly of several elements 1 and coupling members 3 easy to handle because there are hardly any movements between these elements when they have been connected, enabling a next first element to be connected easily, without any additional assistive devices being required, such as a mounting strip to position the elements in a straight line, or adhesive tape to secure all or part of the assembly. Furthermore, the fact that the panel-type element is enclosed between base part 4 and bulges 6 on the ends of the protrusion 5 prevents an element 1 tilting relative to coupling member 3 from the flat plane of the assembly or it at least greatly reduces the extent of possible tilting.

Figure 5:
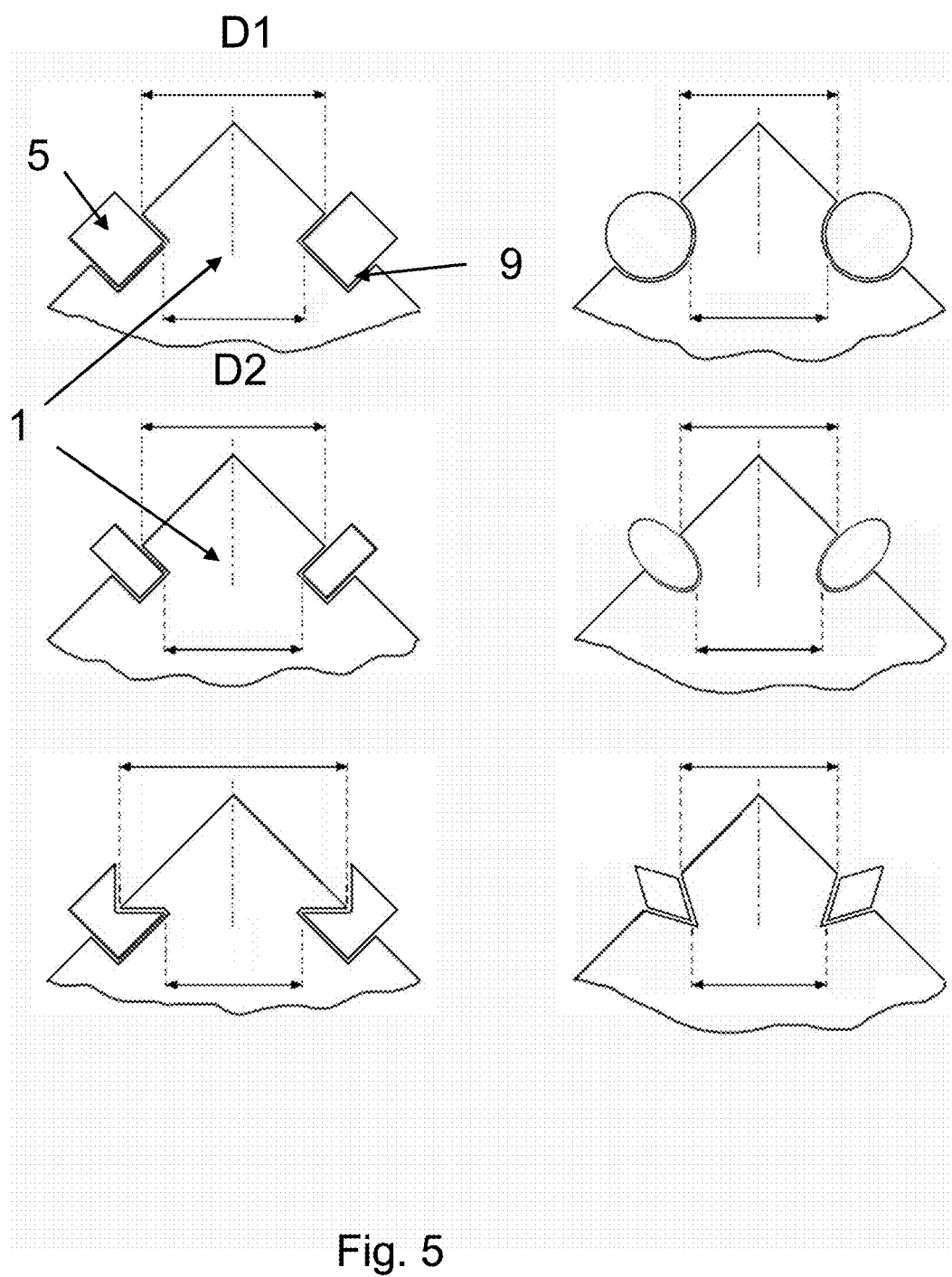
FIG. 5 shows embodiments of the invention.

FIG. 5 illustrates embodiments according to the invention. The first element 1 features incisions 9 in the edge of the material on both sides of a corner in order to enclose the first element 1 between protrusions 5, with incisions 9 enabling the connection of base part 4 to bulge 6 by means of protrusion 5. The minimum distance D2 between two contiguous incisions in the panel-type element 1 is smaller than the minimum distance D2 between two contiguous incisions on the edge of element 1. This encloses the first element 1 between the protrusions 5 preventing it from rotating in the flat plane of the assembly relative to coupling member 3.

Figure 6:
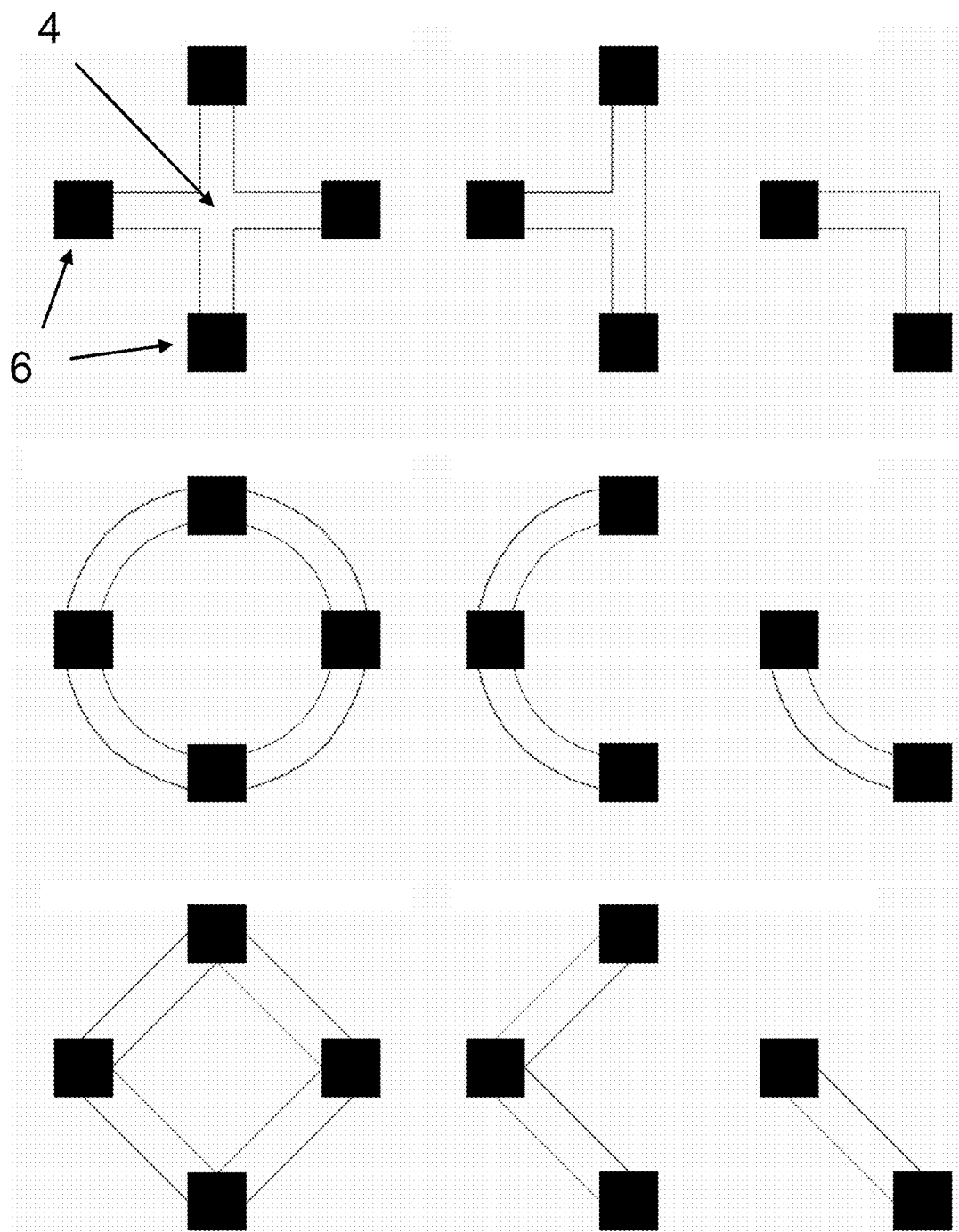
FIG. 6 shows some embodiments for a coupling member

FIG. 6 shows a number of embodiments according to the invention for coupling members 3. The base part 4 can have the shape of a cross, a straight line, a triangle or a circular shape. A square shape and curved lines are also possible. In all cases, base part 4 is partly located alongside and/or inside a first element 1 enabling it to enclose the panel-type part of element 1 by working together with bulge 6.

Figure 7:
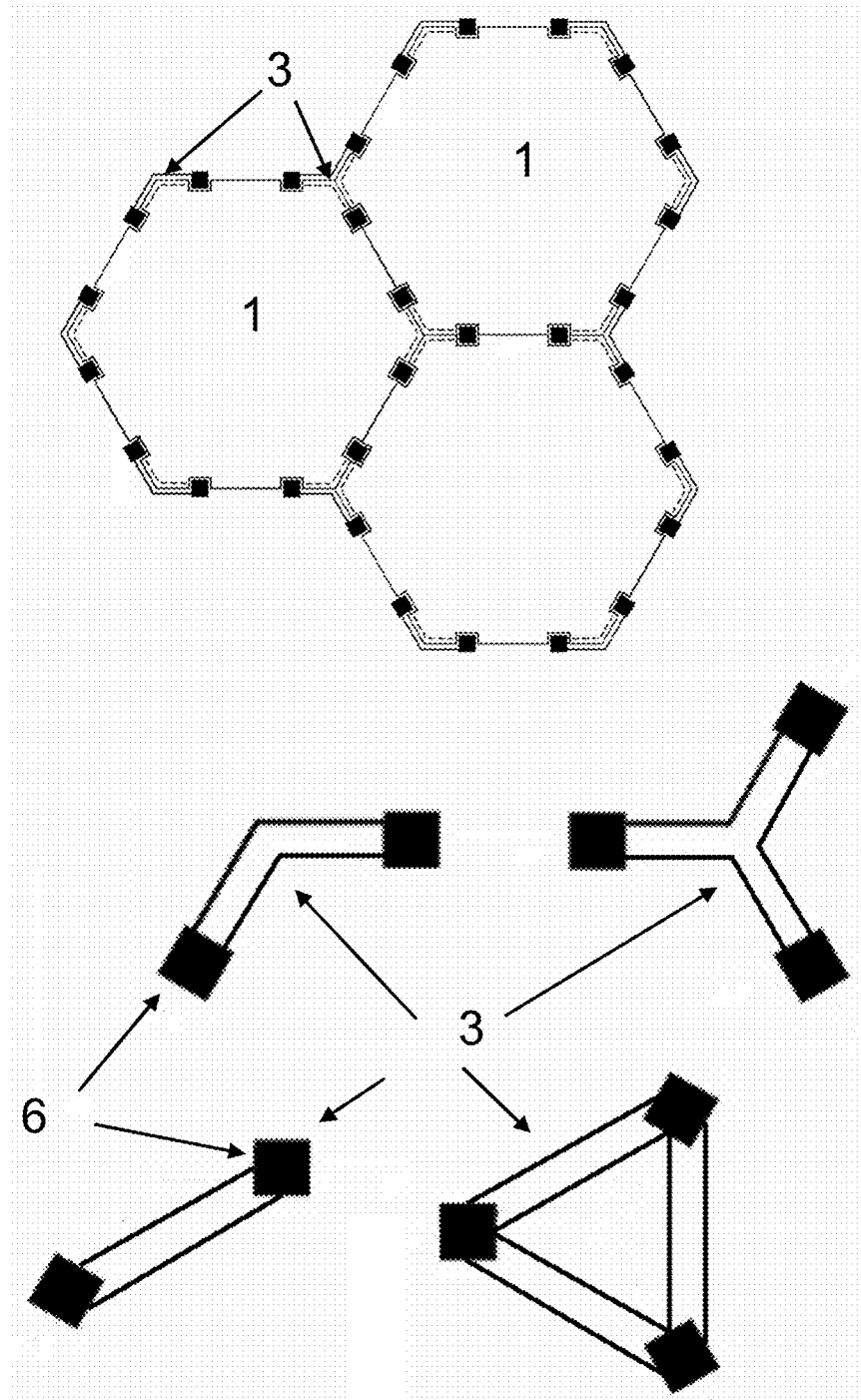
FIG. 7 shows a hexagonal set-up

FIG. 7 shows an embodiment where the first elements 1 have a hexagonal shape. Possible basic shapes of coupling members 3 are also shown; two contiguous notches of these hexagonal shapes also form a constriction.

Figure 8:
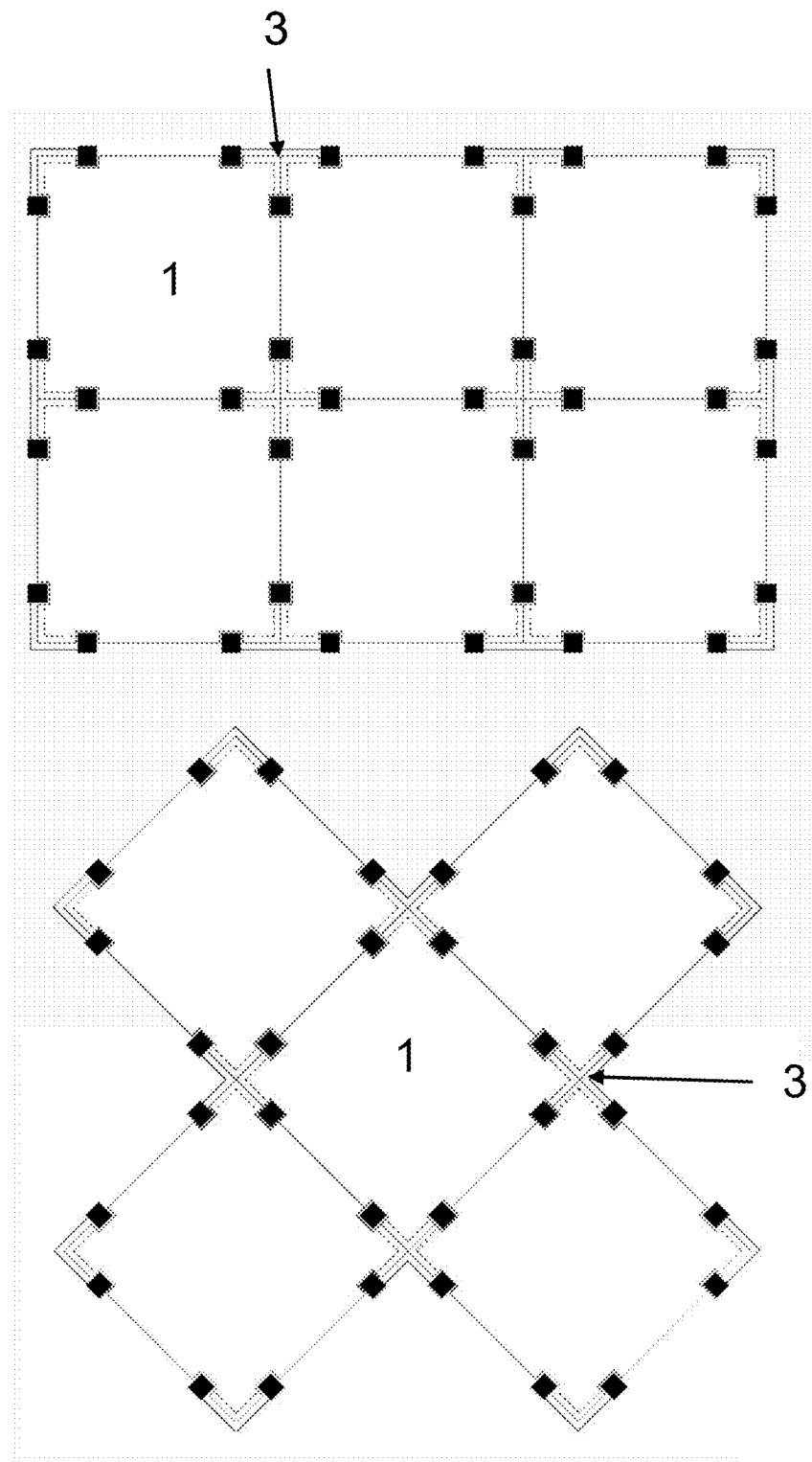
FIG. 8 shows two collages

FIG. 8 shows two options for creating a collage with rectangular elements 1.

Figure 9:
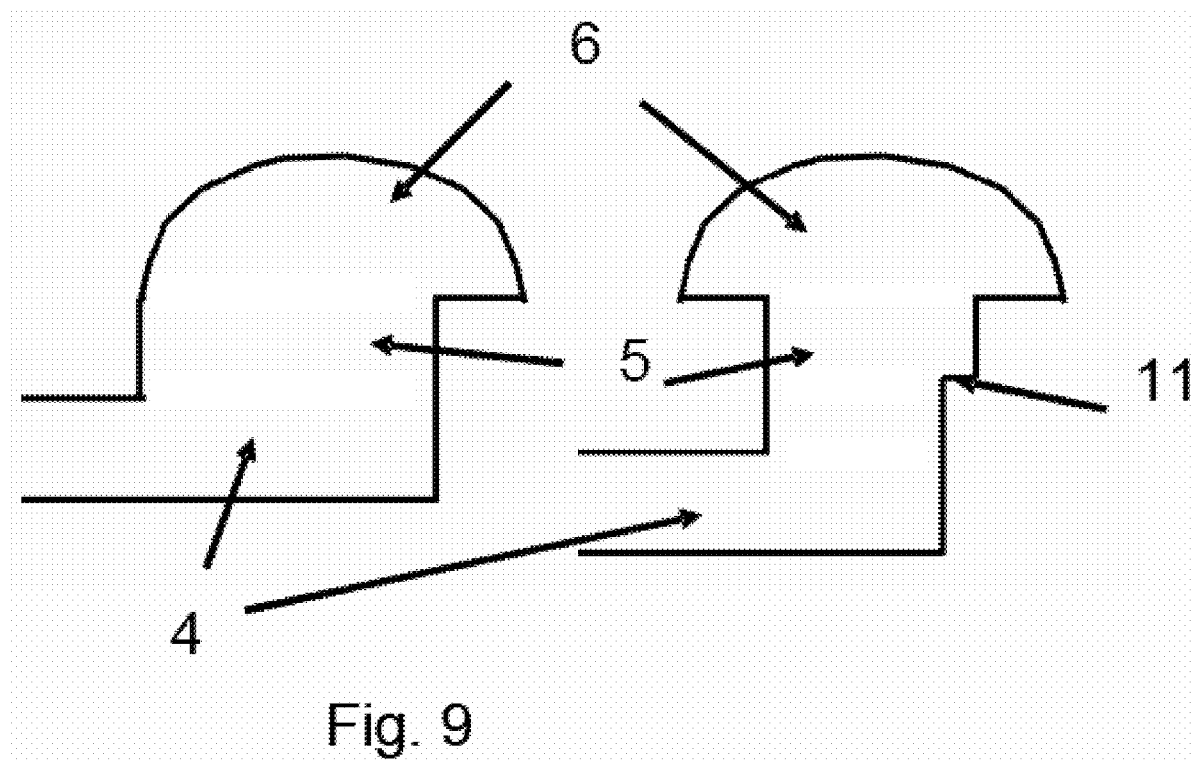
FIG. 9 shows a preferred embodiment of the invention.

FIG. 9 illustrates a preferred embodiment. The protrusion 5 features a protruding edge 11 under the bulge 6, enabling the protrusion to work together with different complementary incisions in panels: small incisions for thin panels and larger incisions for thicker panels. The thin panels are then held under the protruding edge 11 while thicker panels are held under the edge of bulge 6. Of course, more than one edge 11 can be featured, enabling a variation in panel thicknesses. In most embodiments according to the invention, the underside of the bulge 6 is the contact face with the panel-type elements 3; FIG. 9 shows how edge 11 is the contact face for thin panel material. The distance between the contact face along edge 11 or bulge 6 and coupling members 3 in between which panel-type elements 1 can be enclosed is, in most cases, at least the thickness of the panel-type elements at the location of the connection.

Figure 10:
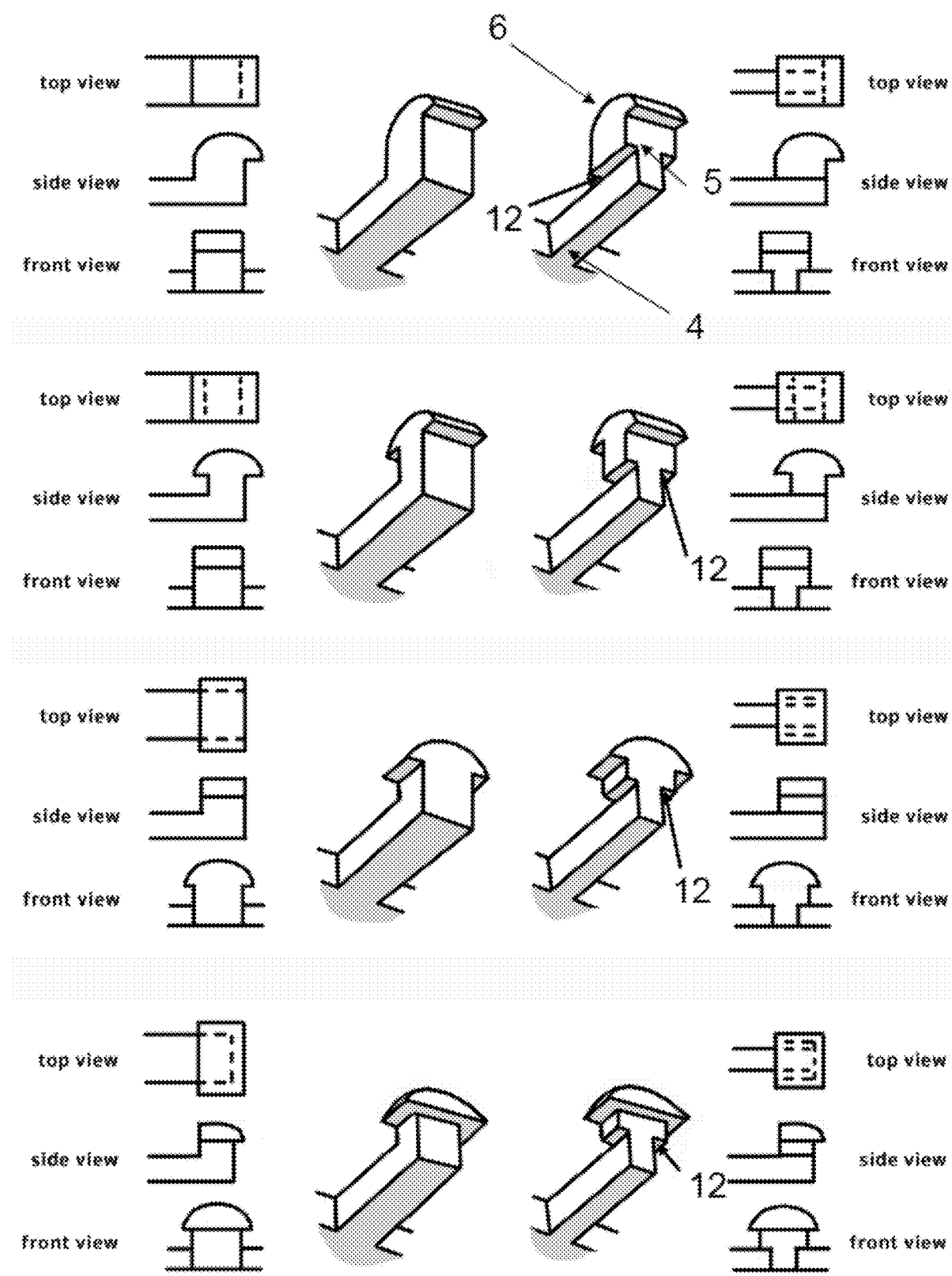
FIG. 10 illustrates a further embodiment.
Figure 14:
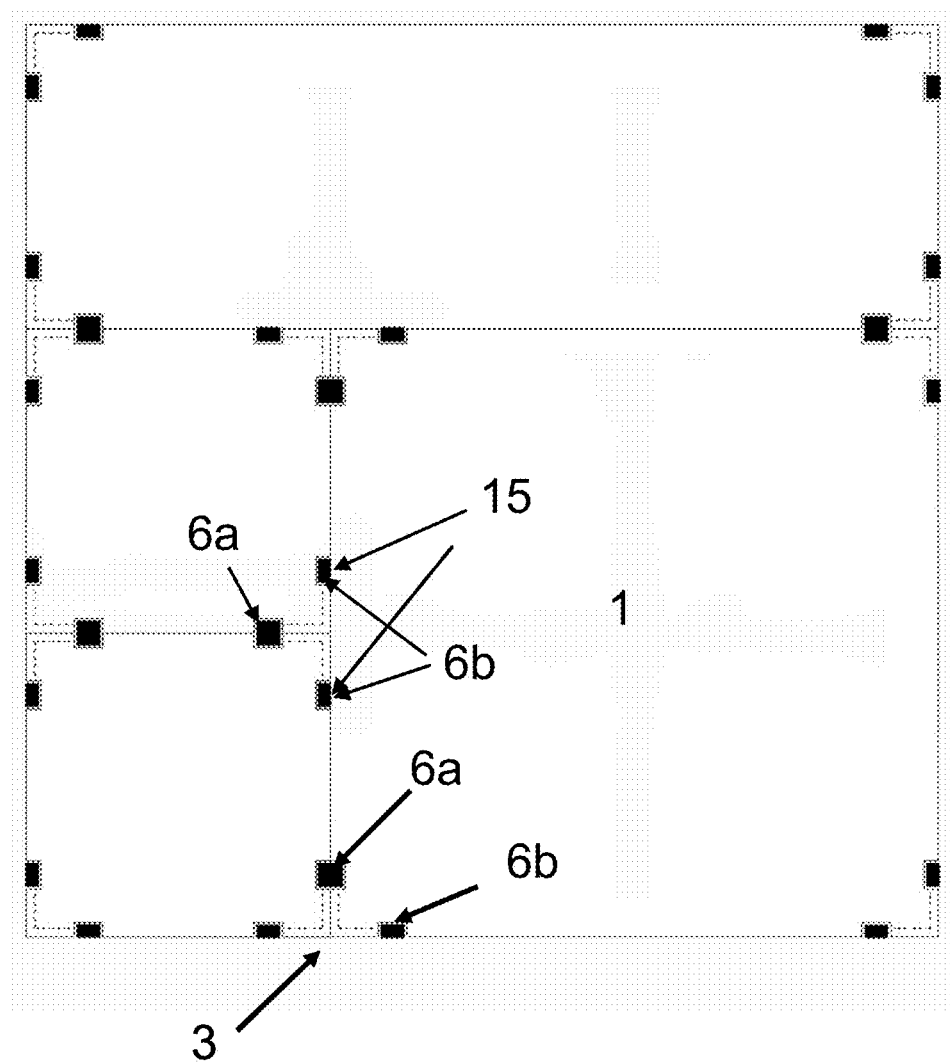

FIG. 10 shows different embodiments. The left hand side of the figure shows embodiments where the protrusion 5 is as wide as the part of the base part from which it protrudes, whereas the right hand side features similar embodiments where the protrusions are wider than the part of the base part from which they protrude, and since these protrusions are wider, an edge 12 can be seen. This simplifies the application of the first element from below, as shown in FIG. 14.

Figure 11:
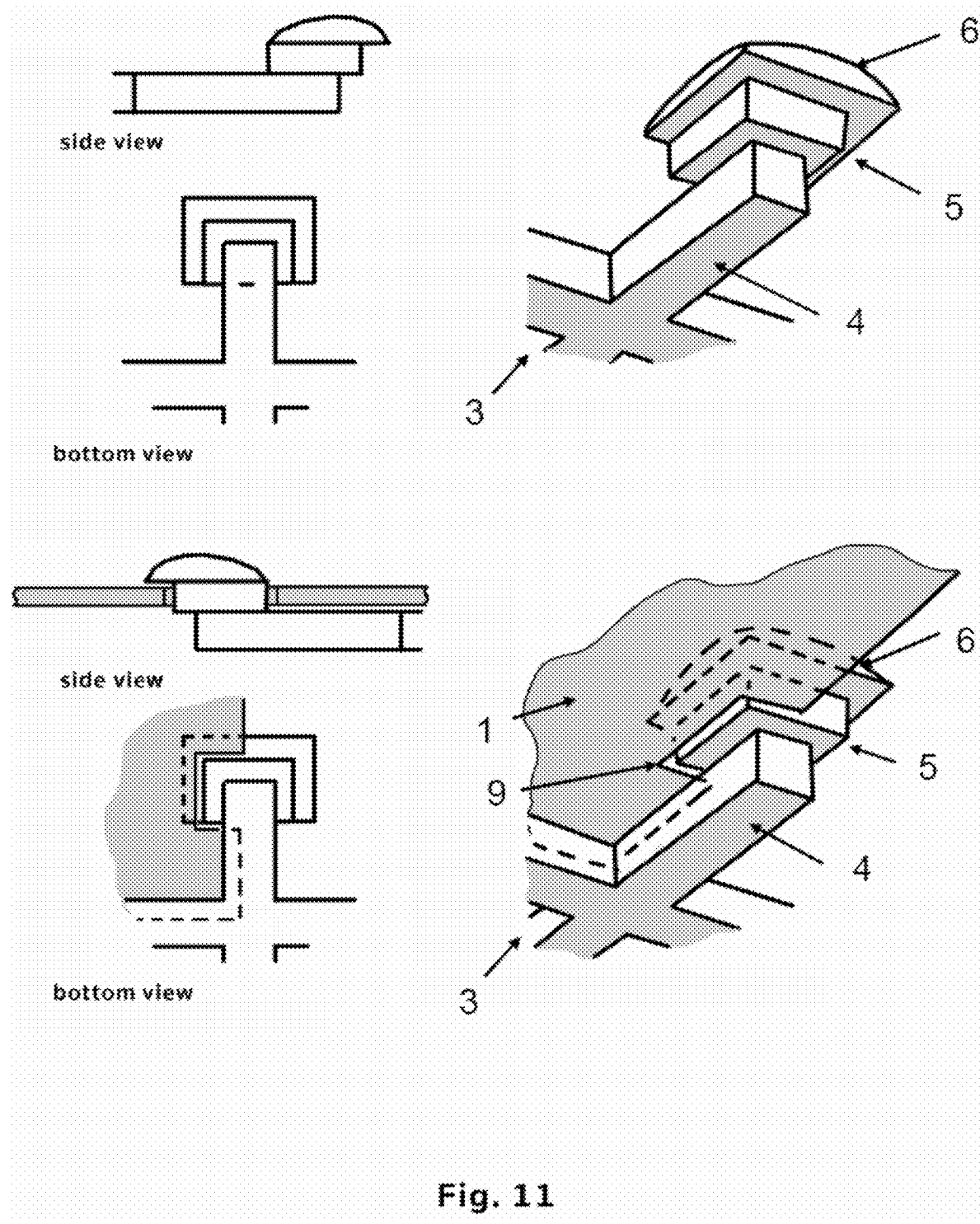
FIG. 11 illustrates how to secure a thick panel

FIG. 11 shows how a slightly thicker panel is secured under the bulge 6.

Figure 12:
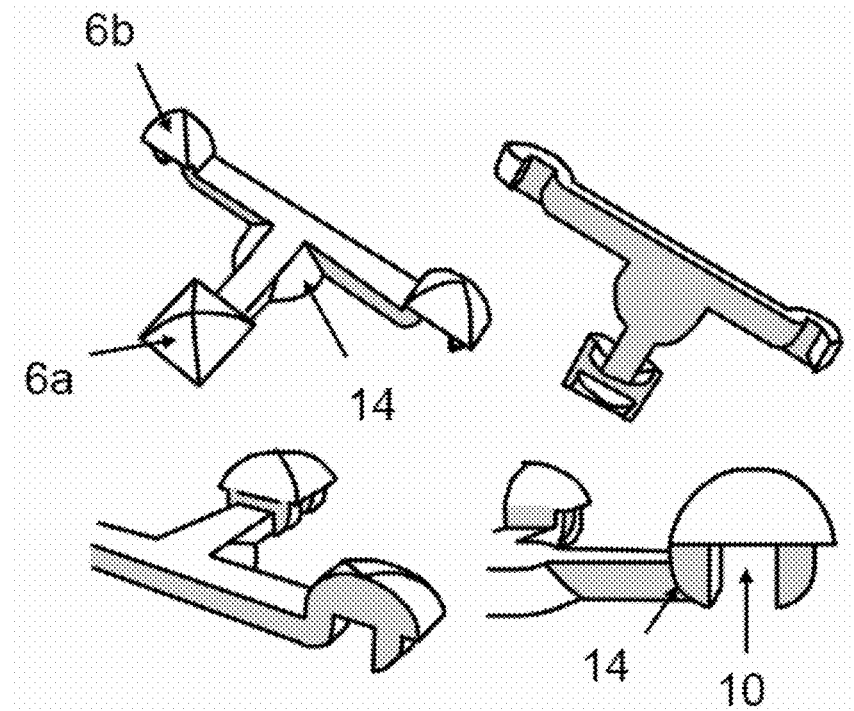
FIGS. 12 to 21 show further embodiments of the invention The figures are not drawn to scale; as a rule, like numerals denote like elements.

FIG. 12 shows another preferred embodiment. Edges of the base part 4 feature slanted walls 14. These walls guide a first element when inserting it. This is illustrated in FIG. 12. FIG. 12 also shows that a coupling member in the form of a tripod features two different protrusions, i.e. two "half" protrusions 6b on the two legs that are in one line, and one "whole" protrusion 6a on the third leg.

Figure 13:
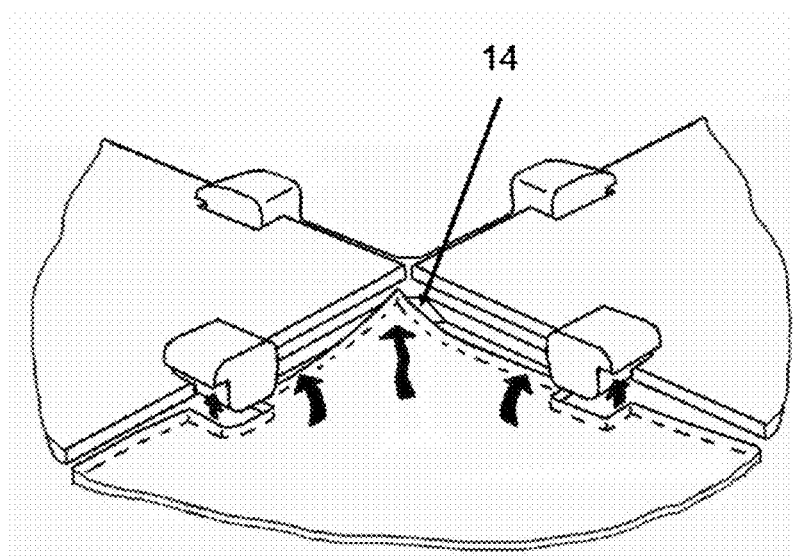

FIG. 13 shows a method of clamping a first element according to the invention where the partially bent first element 1 can be brought along the bottom panel 4 from below, after which it is enclosed between bottom panel 4 and bulge 6 in a tension-free state and is thus blocked against movement from the flat plane of the assembly and, in this example, the first element 1 is also enclosed between the two contiguous protrusions 5 of the coupling member 3 and thus the movements in the flat plane are greatly reduced to movements that are possibly due to the tolerances between the circumference of protrusion 5 and notch 9.

FIG. 14 shows the advantage of this preferred embodiment. This shows an example in which first elements of different sizes can easily be assembled into a collage. A large first element can be bridged by means of two first elements roughly half as large by assembling them with a coupling member 3 consisting of a tripod, as shown, for example, in FIG. 13. No protrusion extends where the large first element does not feature any incisions, for example at positions 15. The size of the protrusions 6b on two of the three legs of the tripod is half that of the protrusion 6a.

Figure 15:
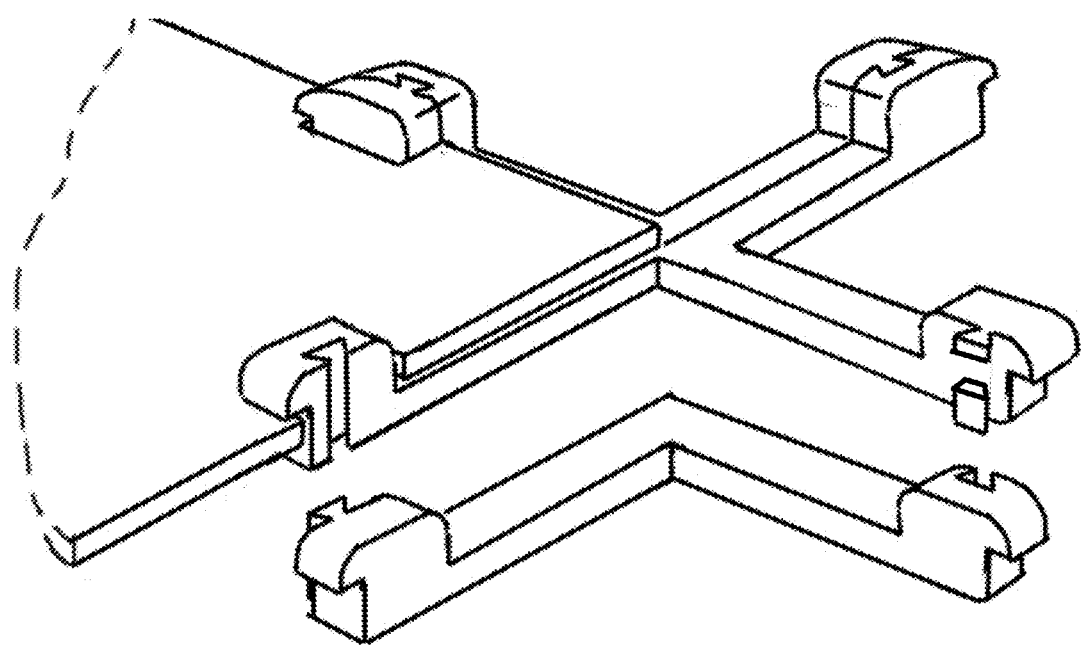

FIG. 15 shows another embodiment. The coupling members consist of a number of standard parts. Attaching the parts together, for example by dovetailing as shown in this example, enables a standard part to be used to create a bipod (i.e. the standard part), a tripod, or a cross. This reduces the number of different parts needed.

In this example, the standard modules are dovetailed together; they can also be connected in a different manner, for example by means of a pushbutton connection or a bayonet connection or using any other common mounting solution.

Figure 16:
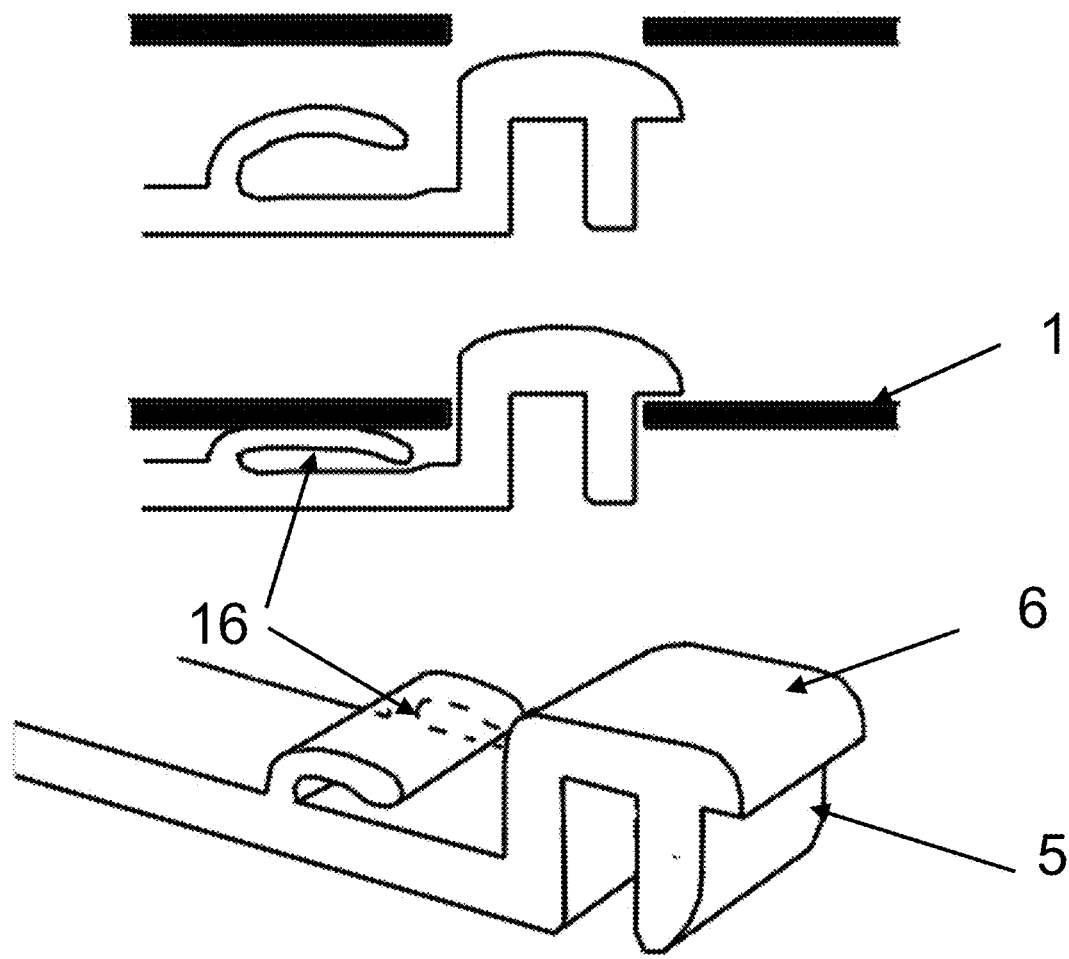

FIG. 16 shows a second element 3 as a coupling member characterized in that there is a shape 16 on this coupling member which acts as a spring element when assembling a first element 1, acting on the lower side of the element and pushing it towards the contact face of the bulge, thus strengthening the clamping force and enabling a wider range of panel material thicknesses for the first element 1.

Figure 17:
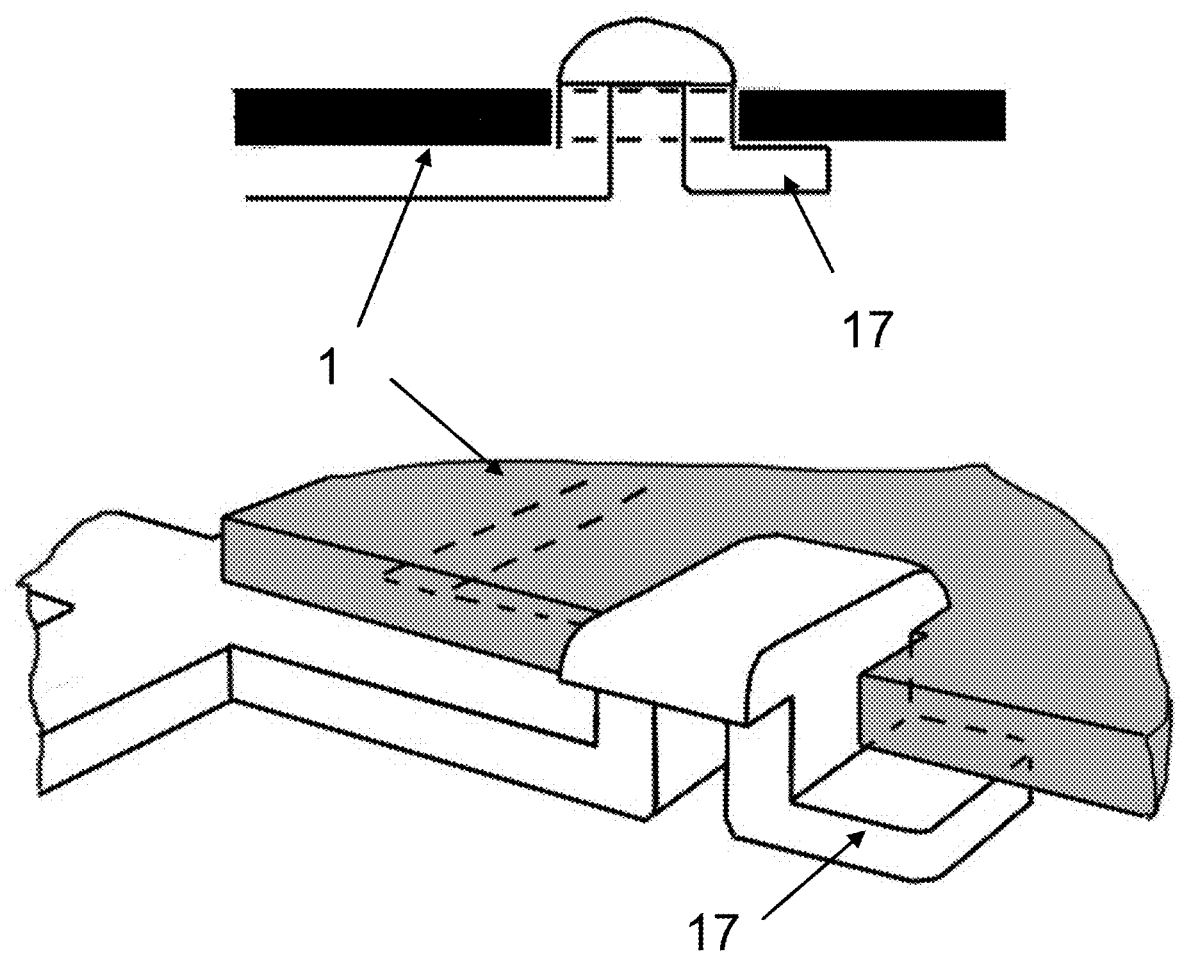

FIG. 17 shows a second element 3 with the base plane 4 also extending beyond the upright protrusion 5; this part 17 supports the element 1. The fact that the element 1 is supported by the protruding part 17 of base plane 4 of coupling member 3 makes the assembly stronger and easier to assemble.

Figure 18:
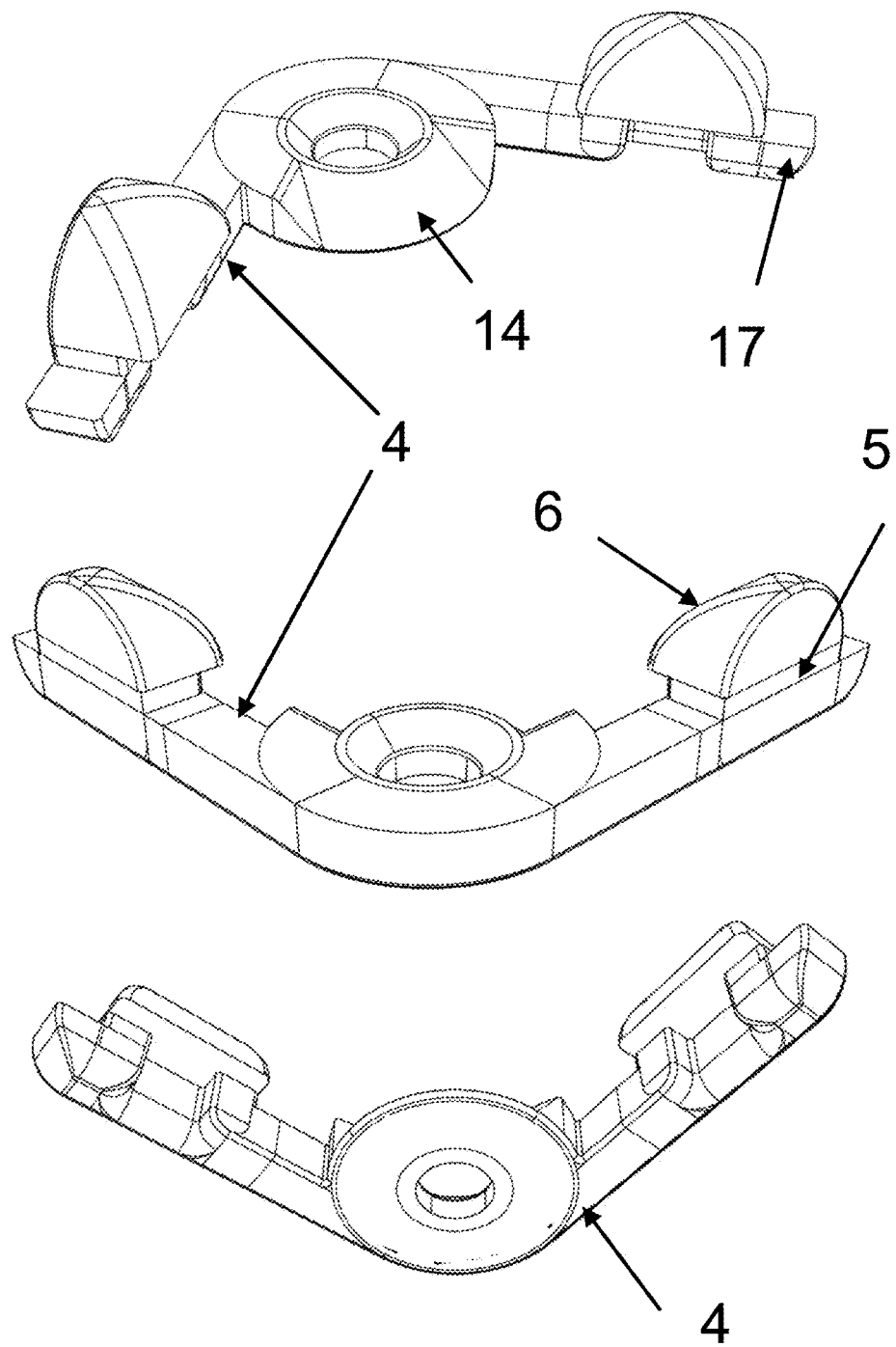
Figure 19:
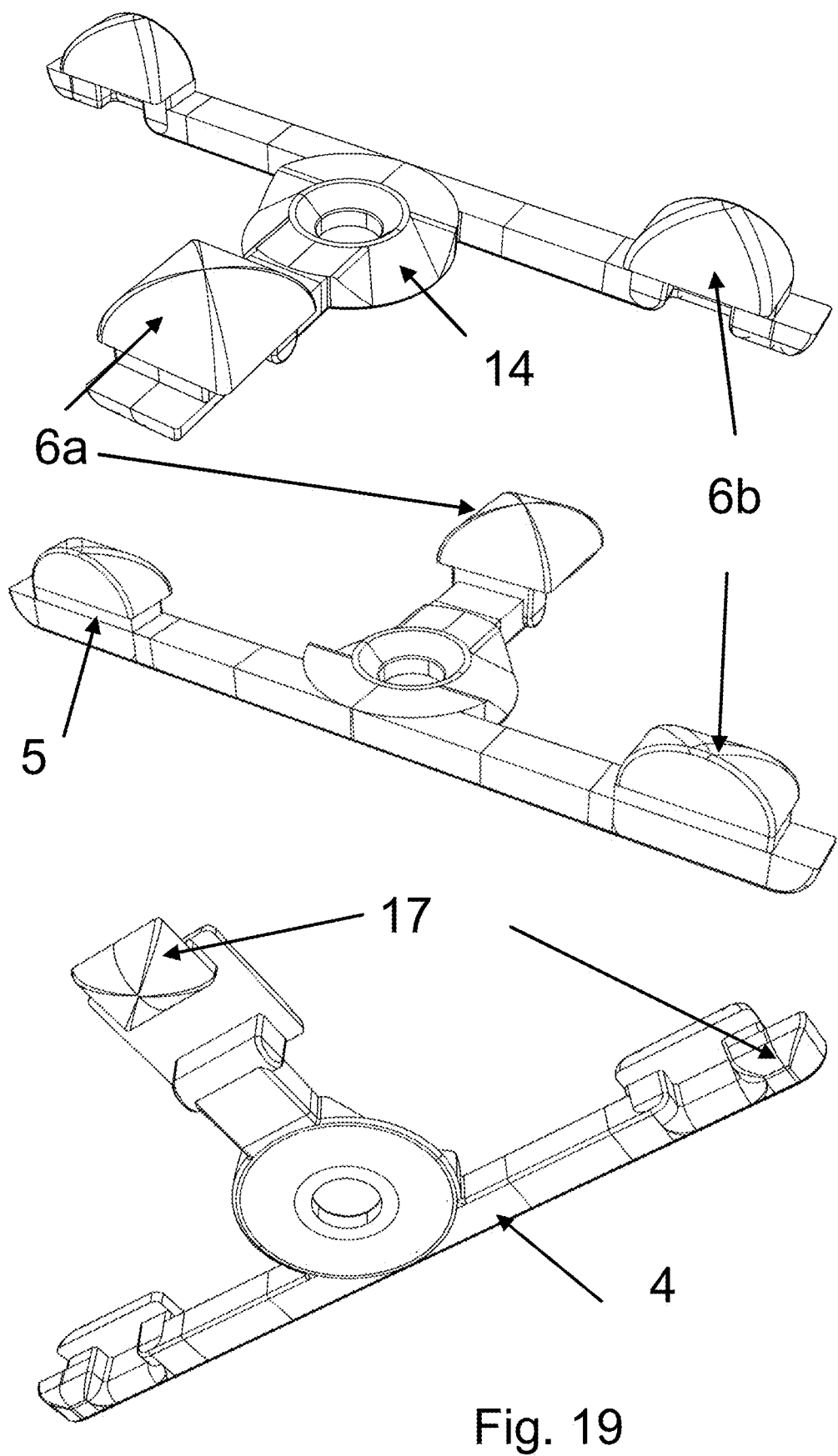
Figure 20:
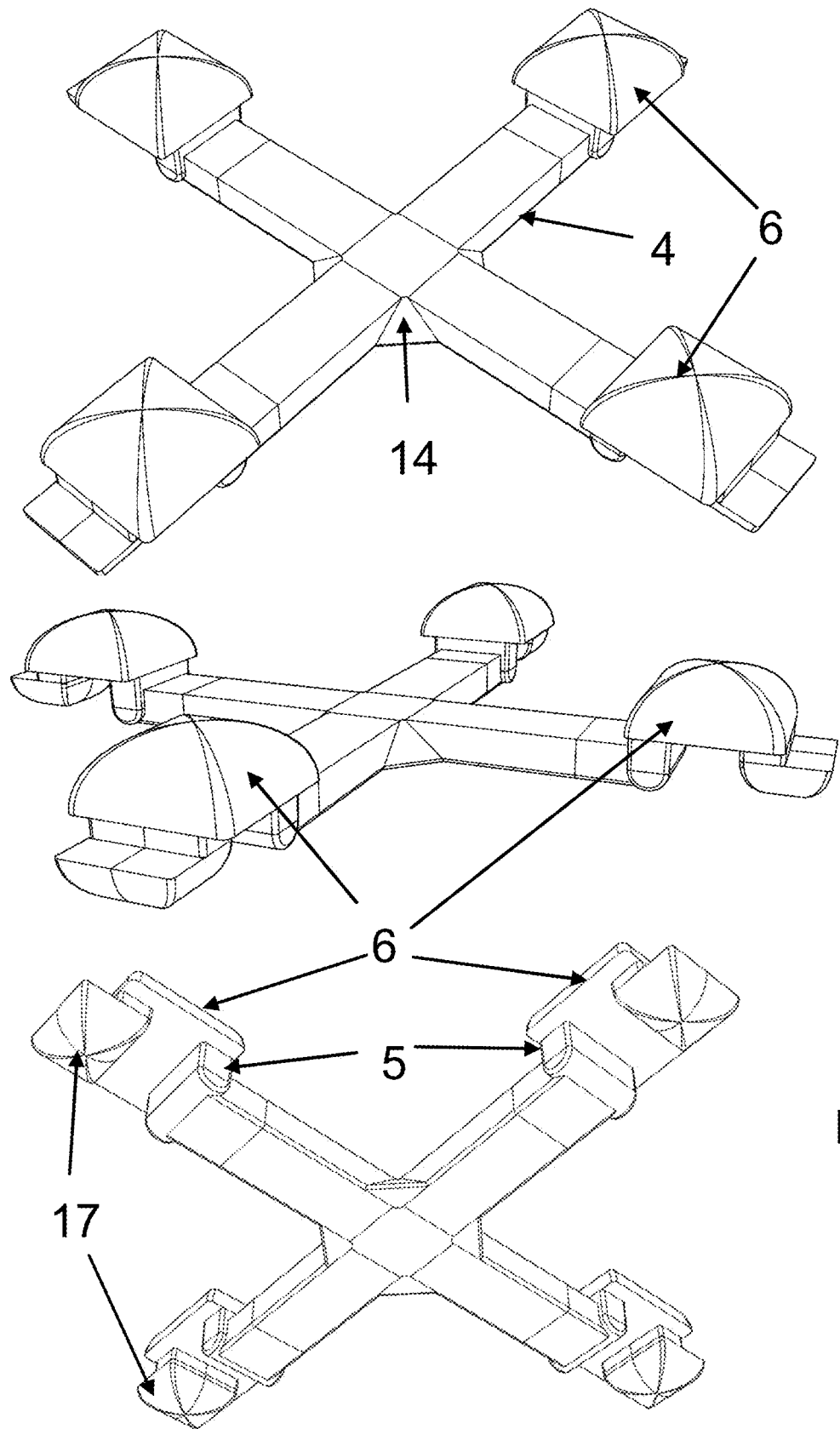
Figure 21:
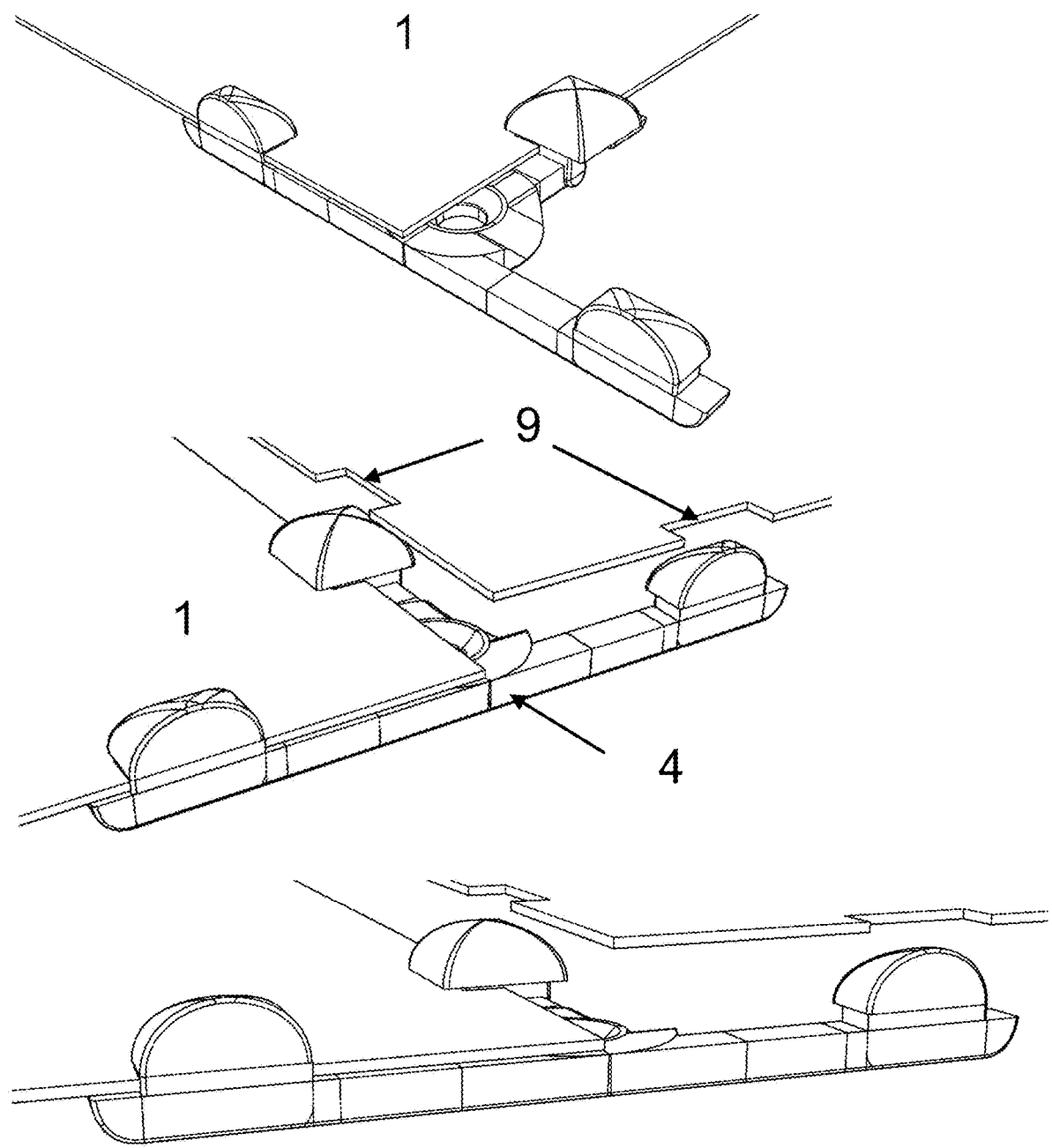

FIGS. 18 to 20 show a number of embodiments of a coupling member for an assembly according to the invention. FIG. 18 shows a bipod, FIG. 19 a tripod and FIG. 20 a four-legged structure. Some parts are identified by numbers in these figures. In order to keep a good view of the overall picture, not all the parts have been identified in all the figures. FIG. 21 illustrates how the two first elements 1 are secured using a coupling member, in the form of a tripod in this example.

It will be clear that the invention enables many variations and that the invention is not limited to the examples described above. The characteristics of different embodiments can be combined.

The invention claimed is:

1. An assembly comprising:
    a plurality of first elements, wherein each first element comprises a multi-sided flat panel; and
    a plurality of second elements, wherein each second element comprises a coupling member that interconnects the plurality of first elements;
    wherein:
    at least one pair of adjacent sides of each panel, forming a respective corner thereof, comprises a pair of notches that form an opening at each edge of the sides;
    each second element comprises a base part comprising a plurality of upright protrusions extending transversely from a first side thereof, each upright protrusion interfacing with a corresponding notch in the flat panels;
    each upright protrusion comprises an upright part protruding substantially perpendicular to the base part, and a bulge at an end of the upright part that extends laterally at least partially beyond the upright part;
    pairs of adjacent upright protrusions are situated on the base part such that the upright parts of each pair of adjacent upright protrusions fit into a corresponding pair of notches at a respective corner of at least one of the flat panels; and
    each bulge extends over a portion of a first face of at least one first element adjacent each respective notch, and a respective portion of the base part extends under a portion of an opposing second face of the respective at least one first element, to secure the at least one first element between the bulge and the base part substantially parallel to the base part.

2. The assembly of claim 1, wherein one or more of the protrusions are rounded.

3. The assembly of claim 1, where the plurality of first elements can be bent flexibly, enabling them to be removed from the second elements.

4. The assembly of claim 1, wherein a distance between the base part and a contact face on the bulge of at least one second element at least equals a thickness of a corresponding secured first element.

5. The assembly of claim 1, wherein the notches in the edge of at least one first element extend into the flat plane toward the diagonal of a corner.

6. The assembly of claim 1, wherein the notches extend virtually transversely into the edges of at least one first element.

7. The assembly of claim 1, wherein at least one second element comprises one or more slots that each extend into a respective one of the protrusions.

8. The assembly of claim 7, wherein the slot extends into a respective portion of the base part.

9. The assembly of claim 1, wherein at least one protrusion comprises an extending edge under the bulge.

10. The assembly of claim 1, wherein at least one coupling member is in the form of a tripod, with a protrusion on each leg of the tripod, wherein one pair of legs is in one line and a third leg is positioned transversely to them, and wherein the protrusions on the pair of legs are substantially similar and substantially different from the protrusion on the third leg.

11. The assembly of claim 1 wherein the base part comprises a part that radially extends beyond at least one of the protrusions.

12. The assembly of claim 1 wherein the assembly forms a photo collage.

13. The assembly of claim 1, wherein at least one first element comprises thermally deformed panel materials.

14. The assembly of claim 1, wherein at least one second element comprises a spring element that presses the corresponding secured first element against the corresponding bulge or a corresponding protruding edge of the protrusion.

15. A coupling device coupling a plurality of multi-sided flat panels, at least one pair of adjacent sides of each flat panel forming a respective corner thereof, and having a pair of notches that form an opening on each edge of the sides, the coupling device comprising:
    a base part comprising a plurality of upright protrusions extending transversely from a first side thereof;
    wherein:
    each upright protrusion includes an upright part protruding substantially perpendicular to the base part, and a bulge at an end of the upright part that extends laterally at least partially beyond the upright part;
    pairs of adjacent upright protrusions are situated on the base part such that the upright parts of each pair of adjacent upright protrusions fit within a corresponding pair of notches at a respective corner of at least one of the flat panels; and
    each bulge extends at least partially over a portion of a first face of at least one flat panel adjacent each respective notch, and a respective portion of the base part extends under a portion of an opposing second face of the respective at least one first element, thereby securing the flat panel between the bulge and the base part at the corner of the flat panel substantially parallel to the base part.

16. The coupling device of claim 15, wherein one or more of the protrusions are rounded.

17. The coupling device of claim 15, wherein a distance between the base part and a contact face on the bulge of at least one protrusion at least equals a thickness of the at least one flat panel.

18. The coupling device of claim 15, wherein the coupling device comprises one or more slots that each extend into a respective one of the protrusions.

19. The coupling device of claim 18, wherein the slot extends into a respective portion of the base part.

20. The coupling device of claim 15 wherein the base part comprises a portion that radially extends beyond at least one of the protrusions.

* * * * *